United States Patent [19]

Sama

[11] 4,136,601
[45] Jan. 30, 1979

[54] NO TIE DOWN VALVE

[76] Inventor: Nicholas Sama, 19120 Bel Aire Dr., Miami, Fla. 33157

[21] Appl. No.: 808,376

[22] Filed: Jun. 20, 1977

[51] Int. Cl.² .............................................. F16K 17/00
[52] U.S. Cl. ........................................ 91/424; 137/111
[58] Field of Search .................. 137/111, 102; 91/424, 91/425

[56] References Cited

U.S. PATENT DOCUMENTS

| 2,778,372 | 1/1957 | Jaquith | 137/111 |
| 3,273,582 | 9/1966 | Valentine | 137/111 |
| 3,848,848 | 11/1974 | DeTirro | 91/424 X |

Primary Examiner—William R. Cline
Attorney, Agent, or Firm—Robert J. Van der Wall

[57] ABSTRACT

A no tie down valve or device for the actuation of hazardous machinery. The device comprises a spool moving within a cylindrical cavity having capped ends; input ports, an output port, and an exhaust port are located at suitable positions on the cylindrical cavity wall such that a pressurized output can only be obtained if both inputs are pressurized, and subsequently held, within a small time interval determined by design parameters of the device. An equivalent construction in terms of poppet or diaphragm-type seals, which is inherently more reliable and maintainance-free than spool construction, is also described.

5 Claims, 5 Drawing Figures

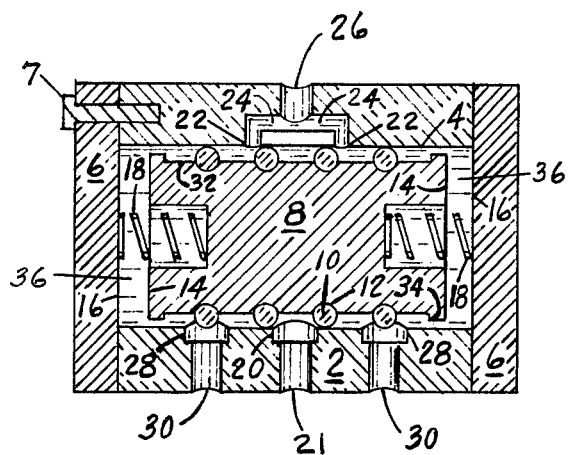
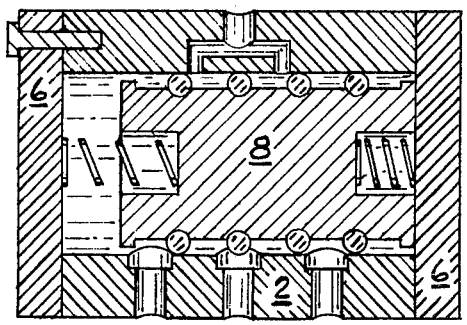
FIG. 1  FIG. 2
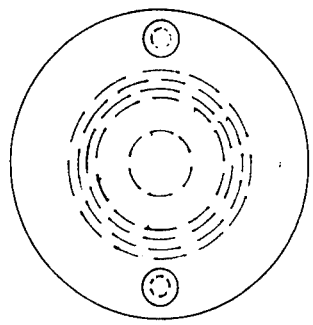
FIG. 3
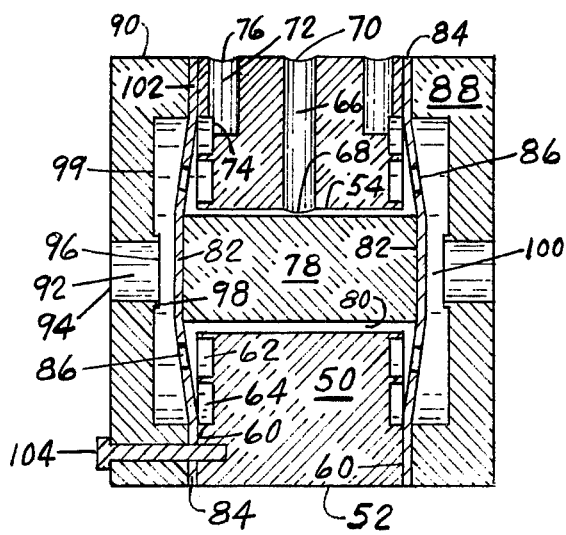
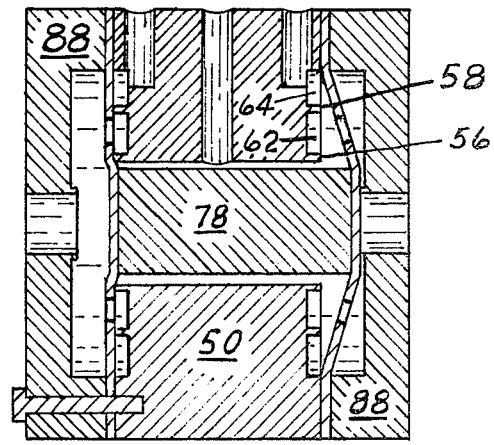
FIG. 4  FIG. 5

NO TIE DOWN VALVE

BACKGROUND OF THE INVENTION

1. Field of the Invention

This invention relates to fluid power safety devices known as "No Tie Down" devices and circuits, whereby actuation of a hazardous machine cannot be accomplished unless the operator thereof actuates two hand valves or switches in a near-simultaneous fashion.

2. Description of the Prior Art

The conventional manner of achieving no tie down characteristics has been to arrange a system of valves controlled by a pulse valve, the arrangement being known as a no tie down circuit. Such a circuit will ensure that a pressurized output can be obtained if and only if two hand valves are actuated and held within a predetermined small time interval. This procedure has obvious beneficial application in controlling hazardous machinery, since proper mounting of the hand valves can make it impossible for the operator thereof to have either of his hands in dangerous areas during actuation. Beyond the desirability of the no tie down process, there is the fact that it is now law in the United States that any hazardous industrial machinery must be so equipped.

The problem with the present arrangement is the complexity of no tie down circuits, and, consequently, their high cost and increased probability of failure.

SUMMARY OF THE INVENTION

The instant invention achieves no tie down features via a novel and much simpler approach than is provided by no tie down circuits. The necessary operating characteristics are achieved by a single valve comprising a spool moving within a cylindrical cavity having capped ends; input ports, output ports, and an exhaust port are located at suitable positions on the cylindrical cavity wall such that a a pathway can exist between input and output ports only if the inputs are both pressurized and held within the small time interval necessary to fully shift the spool to one side or the other of the cylindrical cavity, this time interval being determined by the design parameters of the device. If either input is off during the entire time interval, then the output of the device becomes connected to the exhaust port, while the other, unpressurized input is blocked off.

An equivalent construction in terms of poppet or diagphram-type seals, which is inherently more reliable and maintainance-free than a cylinder and spool arrangement, is also described.

BRIEF DESCRIPTION OF THE DRAWING

FIG. 1 shows a sectional elevation of the device, and represents a cut taken by a plane containing the axis of the cylindrical valve body.

FIG. 2 shows a sectional elevation of the device in the configuration appropriate to pressurization of the left-hand input only.

FIG. 3 is an end-view of the device of FIGS. 1 and 2.

FIG. 4 shows a sectional elevation of an alternate embodiment of the device, and represents a cut taken by a plane containing the axis of the valve body.

FIG. 5 shows a sectional elevation of the alternate embodiment in the configuration appropriate to pressurization of the left-hand input only.

DESCRIPTION OF THE PREFERRED EMBODIMENT

Referring to FIG. 1, a cylinder 2 has a cylindrical inner bore 4 and is capped by idential end-caps 6 at both ends. Some means such as the bolts 7 sealingly secure the end-caps 6 to the cylinder 2. A spool, consisting of the cylindrical piston 8 and O-rings 10 captivated in grooves 12, is free to slide sealingly in the bore 4, but limited to a movement T/2 in either axial direction, where T is the total piston travel and is determined by the spacing between the end-faces 14 of the piston 8, and the innerfaces 16 of the end-caps 6. The annular space 17 permits a fluid flow between the bore 4 and the piston 8. Spring means 18 maintain the spool in a central position when the device is not pressurized. The O-rings 10 when in minimum sealing contact with the bore 4 deform slightly so as to produce a circumferential contact band of width W.

A circular exhaust port 20 of diameter T - W is provided on the bore 4 midway between the end-faces 16. An exhaust duct 21 leads outwardly from the exhaust port 20 to the outer surface of the cylinder 2, with connection means optionally provided thereat for fluid-flow connection to external fluid power systems. Circular output ports 22 of diameter given by T/2 - W are provided on the bore 4 so as to be axially equidistant from the exhaust port 20, with the axial spacing between exhaust port centers equal to 3T/2. Conduit means 24 join the ports 22 to a common output duct 26 on the outer surface of the cylinder, with means provided thereat for fluid-flow connection to external fluid power systems. Input ports 28 of diameter T - W are provided on the bore 4 axially equidistant from the exhaust port 20, with the axial spacing between input port centers equal to 3T. Input ducts 30 lead outwardly from the input ports 28 to the outer surface of the cylinder 2, with connection means thereat for connection to external fluid power systems.

The four grooves 12 of the piston 8 are equally spaced, with the spacing between adjacent groove-width centers equal to the spool travel T. The outer portions 32 of the piston 8 may be made just long enough to secure the outer O-rings, but are shown in the drawing as having a length approximately equal to the spool travel T, which length permits the inclusion of the optional leakage flanges 34 suitable for timing purposes, as more fully specified hereinafter. The flanges 34 fit closely in, but do not touch, the bore 4. The volumes 36 between the piston end-faces 14 and the end-cap inner faces 16 serve as timing chambers when the leakage flanges 34 are incorporated in the device.

In operation, then, if both inputs are pressurized in near simultaneous fashion, there will be a balancing of the pressure forces on the spool; this fact in combination with the effect of the springs 18 will result in the spool remaining as shown in FIG. 1. Thus the output is and will remain pressurized as long as bothe inputs are kept pressurized. If then one of the inputs is depressurized, say the right input, the spool will quickly shift to the configuration shown in FIG. 2, whereby the output is connected to exhaust and the left input is blocked off, with resulting depressurization of the output.

Conversely, if instead of near-simultaneous pressurization of both inputs, one pressurizes only one input, say the left input, then the spool will begin to shift to configuration of FIG. 2, this by virtue of the pressure buildup in the left timing chamber 36 that results from the leakage flow past the timing flange 34. It is clear that once the spool has fully shifted as in FIG. 2, the pressurization of the opposing right input will no longer have any effect, for the pressurization of the region between the two O-rings now stradling the right input will result in zero net force on the spool; this situation will continue to hold so long as the left input is kept pressurized. Clearly, then, a pressurized output can only be obtained if the second input is pressurized before the spool has fully shifted, in which case the spool will be returned to the central position and the connections of FIG. 1 will apply.

Because the time required for the spool to shift fully depends on the time necessary to adequately pressurize the timing chambers 36, one has a means for varying the time interval within which pressurization of the output can be achieved. This variation can be accomplished either by varying the volume of the chambers 36, or by varying the closeness of fit of the flanges 34 in the bore 4, or by a combination of both.

Because of the way in which the porting is arranged, the question arises, from an examination of FIGS. 1 and 2, as to the possible momentary pressurization of the output by single input pressurization as the spool moves to the fully shifted position. This effect, or "blowby" has been found to be insignificant, due to the rapid connection of the output to exhaust; it may, in fact, be reduced to practically any desired level by appropriate shaping and sizing of the various ports.

An alternate embodiment is shown in FIGS. 4, 5, and 6. This embodiment is constructed in terms of Poppet-type seals, which are inherently more reliable than O-ring seals and have the additional advantage of not requiring lubrication.

Referring to FIG. 3, a body portion 50 has a cylindrical outer surface 52, and coaxial thereto a cylindrical bore 54, with end-surfaces comprising the annular areas 56,58, and 60 together with the annular grooves 62 and 64, such that said annular areas and grooves are all coaxial with the bore 54. The annular areas 56 and 58 are of very narrow width and serve as annular shutoff seats, with the inner area 56 being an output seat and the intermediate area 58 being an exhaust seat. An output duct 66 has inner terminus 68 on the inner bore 54, with the outer terminus 70 adaptable for connection to external fluid power systems. An exhaust duct 72 has inner terminus 74 within the confines of the groove 64, and an outer terminus 76 optionally adptable for connection to external fluid power systems. The piston 78 is of smaller diameter than the bore 54 such that a fluid flow can take place in the annular passage 80, and the piston end-faces 82 are perpendicular to the piston axis and with axial spacing larger than that between the output seats 56 by an amount sufficient to keep the diagphrams 84 from touching the output seats 56, but at the same time smaller than the piston travel as defined below. Holes in the diaphrams 84 are located on a circumference coinciding with the width-center of the groove 62, with the diameters of the holes 86 somewhat smaller than the width of the grooves 62.

End-caps 88 have the same outer diameter 90 as the body portion 50, and an inner bore 92 constituting an input duct, with the outer terminus 94 of the duct 92 being adaptable for connection to external fluid power systems, and the inner terminus 96 on the annular surface 98; the annular surface 98, which is in raised relation to the surface 99, is of very narrow width and serves as an input seat. The spacing 100 between the input seat 98 and the diaphragm 84 defines the half-travel of the piston 78. The annular area 102 of the end-caps 88 is preferably identical to the annular area 60 of the body portion 50. Fastener means 104 rigidly and coaxially join the various parts of the device.

In operation, the alternate embodiment behaves in a manner equivalent to the first. Thus if both inputs are pressurized in near-simultaneous fashion, the pressure forces are balanced and the piston remains as shown in FIG. 3; the diaphragms 84, however, will deform enough to seal the exhaust seat 58 provided the spacing of the piston faces 82 has been properly chosen relative to the axial spacing between the output seats 56 and to the elastic properties of the diaphragms 84. Thus the output in this case will be pressurized and will remain so as long as both inputs remain pressurized. If now one of the inputs, say the right input, is depressurized, and the piston half-travel has been adequately chosen, then the diaphragms and piston will shift to the right sufficiently, as shown in FIG. 4, that the exhaust seat on the right will be opened, while both output and exhaust seats on the left side will be closed, so that the output is vented or exhausted.

Conversely, if only one input, say the left input, is pressurized, then again the configuration of FIG. 4 will apply, with the left output and right input seats blocked off. Clearly, if the area of the right input seat is sufficiently smaller than the area of the piston faces, then pressurization of the right input subsequent to blocking of the right input seat will fail to open the right input seat, and the output remains unpressurized, leading again to the desired no tie down features.

As with the first embodiment, a controllable timing scheme can be incorporated into the alternate embodiment; this would invole a modification of the piston 78, the diaphragms 82, and the input ducts 92. These have not been shown, however, as they are not crucial to the novelty of the instant invention.

Additionally in common with the first embodiment, the alternate embodiment contains considerable latitude in the choice of parameters; the difference between the piston length and the output seat spacing, the piston travel, the diagphram thickness and flexibility, and the width and depth of the output and exhaust grooves, are all interrelated quantities that must be determined in terms of desired operating conditions.

What is claimed is:

1. A fluid power device, hereinafter referred to as a no tie down valve, having two input ports, an output port, and an exhaust port, and so constructed that a pressurized output results if and only if both inputs are pressurized within an interval of time determined by design parameters of the device, and the output becomes depressurized if initially pressurized and either or both inputs is then depressurized;

said device comprising a cylinder and a coacting spool, in combination, said cylinder consisting of a portion having a cylindrical bore capped sealingly and preferably square to the cylindrical bore axis at both ends by end-caps, with fluid-flow porting on said cylinder bore as hereinafter described;

said spool comprising a cylindrical piston having end-faces preferably square to the piston axis, and four ring-type seals such as O-rings seated in circumferential grooves appropriately formed on said piston, with said piston, said seals, and said grooves so sized that the resulting spool may slide easily yet sealingly within said cylindrical bore; said O-rings when in minimum sealing contact with said cylinder deforming slightly to produce a circumferential contact band of the O-ring on the cylinder bore, and width of this band being hereinafter referred to as the O-ring contact width; said piston being shorter in axial extent than said cylinder bore by an amount hereinafter referred to as the spool travel; said four circumferential grooves being symmetrically and equispatially disposed on said piston axis, with an axial spacing between adjacent groove-width centers equal to the spool travel;

said combination being provided with spring means to maintain said spool in a symmetrical position with respect to said cylinder bore whenever neither of said inputs is pressurized, with said symmetrical position being hereinafter referred to as the center position of said spool, while the two extreme positions of travel of said spool will hereinafter be referred to as the left position and the right position, respectively;

said left, center, and right positions, together with said four O-rings, defining and locating nine distinct hypothetical circumferential zones on the bore of said cylinder; said zones being defined by the said O-ring contact bands on said bore as located by the three distinct configurations of said spool in the left, center, and right positions, respectively; said zones being hereinafter referred to by consecutive ordinal number, with the leftmost zone being the first zone, the next to leftmost zone being the second zone, and so on, said cylinder having a left input port on said bore lying entirely between said first and third zones, with at least a portion lying between said first and second zones, and at least a portion lying between said second and third zones;

said cylinder having a left output port on said bore lying entirely between said third and fourth zones;

said cylinder having an exhaust port on said bore lying entirely between said fourth and sixth zones, with at least a portion lying between said fourth and fifth zones, and at least a portion lying between said fifth and sixth zones;

said cylinder having a right output port on said bore lying entirely between said sixth and seventh zones;

said cylinder having a right input port on said bore lying entirely between said seventh and ninth zones, with at least a portion lying between said seventh and eighth zones, and at least a portion lying between said eighth and ninth zones;

said output ports being connected by a fluid-flow connecting means to a common output duct; said output duct having its outer terminus on the outer surface of said cylinder, with said outer terminus adaptable for fluid-flow connection to extenal fluid power systems;

said input ports being the inner termini of respective input ducts; said input ducts having their respective outer termini on the outer surface of said cylinder, with said outer termini adaptable for fluid-flow connection to external fluid power systems;

said exhaust port being the inner terminus of an exhaust duct having its outer terminus on the outer surface of said cylinder, with said outer terminus optionally adaptable for fluid-flow connection to external fluid power systems.

2. A device as set forth in claim 1, wherein the end-portions of said piston outboard of the outer grooves is of axial extent equal to or greater than the said spool travel, and all or part of said end-portions are of diameter to fit closely in, but not touch, said cylindrical bore, such that when said spool is in said center position, and either but not both inputs is subsequently pressurized, the ensuing fluid flow between the appertaining end-portion and said bore will be restricted in correspondence to the closeness of fit of said piston end-portions in said bore, leading to a slower pressure buildup on the appertaining piston face, leading in turn to a slower shift of the spool to a position where the opposite input becomes blocked off, and thus providing a timing delay within which said opposite input may be pressurized to produce a pressurized output of said device, said timing delay being variable by varying the closeness of fit between said piston end-portions and said cylindrical bore.

3. A device as set forth in claim 1, wherein the distance between the centers of the two inner grooves of said piston is made greater than said piston travel, provided, however, that all axial dimensions pertaining to said cylinder bore be increased correspondingly, so that all valving relationships remain as in claim 1.

4. A device as set forth in claim 2, wherein the distance between the centers of the two inner grooves of said piston is made greater than said piston travel, provided, however, that all axial dimensions pertaining to said cylinder bore be increased correspondingly, so that all valving relationships remain as in claim 2.

5. A no tie down valve, having two input ports, an output port, and an exhaust port, so constructed that
a pressurized output results if and only if both inputs are pressurized within an interval of time determined by design parameters of the device, and
the output becomes depressurized if initially pressurized and either or both inputs is then depressurized; said device comprising
a. a tubular body portion, having coaxial inner and outer surfaces of circular cross-section, and suitable wall thickness as hereinafter indicated; said body portion having a plane of symmetry perpendicular to its axis;
said body portion having two end-surfaces, each comprising three coplanar annular areas alternating with and separated by two annular grooves; said annular areas being perpendicular to and centered on said axis;
the outermost of said annular areas being of width sufficient to permit attachment thereto of a diaphragm hereinafter specified, and the remaining two annular areas being of very narrow width and serving as shutoff seats for said diaphragms, with the innermost and intermediate of said annular areas being hereinafter designated the output seat and the exhaust seat, respectively; the width and depth of said annular grooves being determined by the flow requirements of the device, as well as by the elastic properties of said diaphragms hereinafter described, and the widths of said grooves being approximately the same;
said body portion having an output duct, with the inner terminus of said output duct on an inner surface or bore, of said body portion, and the outer terminus on the outer surface of said body portion, and with said outer terminus adaptable for fluid-flow connection to external fluid power systems;

said body portion having an exhaust duct, with the inner terminus of said exhaust duct within the confines of the outer of said two annular grooves, and the outer terminus on the outer surface of said body portion, and with the said outer terminus adaptable for fluid-flow connection to external fluid power systems;

b. a piston of circular cross-section and flat end-faces perpendicular to its axis, and of diameter somewhat smaller than the bore of said body portion, such that said piston may slide guideably within said bore, yet a fluid-flow may take place between said piston and said bore;

said piston being longer, as hereinafter specified, than the spacing of the two output seats of said body portion;

c. two circular diaphragms, made of an elastomeric material, and of suitable thickness for the intended pressure service, with a diameter equal to the outer diameter of said body portion; said diaphragms each having one or more holes or perforations on a circumference concentric with said diaphragm diameter and having the same diameter as the width-center of the inner annular groove of said body portion, with the diameter of said holes substantially smaller than the width of said inner annular groove; said diaphragms mounted, as more fully specified hereinafter, in a face abutting relationship to, and concentric with, the outer annular area of said body portion;

d. two end-caps, with each of form corresponding to a solid of revolution having a cylindrical outer surface of the same diameter as the outer diameter of said body portion, and with an inner bore preferably considerably smaller in diameter than said pistons; said inner bore constituting an input duct;

each of said end-caps having an outer face surface, with said input duct having its outer terminus thereon, and with said outer terminus adaptable for fluid-flow connection to external fluid power systems;

each of said end-caps having an inner face surface comprising two annular areas separated by an annular groove; the outer of said two annular areas being preferably identical to the outer annular area of said body portion, and the inner of said two annular areas having an inner diameter smaller, by an amount to be specified, than the diameter of said piston, and being narrow of width and constituting a shutoff seat hereinafter referred to as the input seat; said input seat being closer to said outer face surface than said outer annular area by an amount to be specified;

e. means to rigidly and coaxially assemble said end-caps, said diaphragms, and said body portion, such that one of said diaphragms is interposed and sealingly captivated between each of the outer annular areas of the inner face surfaces of said end-caps, and each of the outer annular areas of said body portion;

f. said piston being longer than the axial spacing of said output seats by an amount such that said diaphragms will be slightly displaced or sprung, which in the absence of external forces will serve to maintain said piston symmetrically disposed relative to said body portion, and such that, should both inputs be pressurized simultaneously, said piston will remain in said symmetrical position by virtue of the resulting balanced pressure forces, while said diaphragms will deform elastically an amount sufficient to seal said exhaust seats, but not sufficient to seal said output seats, leading thus to pressurization ot the output;

g. said input seats being sufficiently spaced apart that said piston and said diagphrams may be displaced a distance in either direction hereinafter referred to as the piston travel; said piston travel being sufficient that if said device is so pressurized as to yield a pressurized output, and subsequently on of the inputs is depressurized, then said piston travel will permit said piston and said diaphragms to shift towards the depressurized side an amount sufficient to seal both output and exhaust seats on the side opposite the depressurized input;

forcibly open the exhaust seat on the same side as the depressurized input, thus exhausting or venting the output;

h. the inner diameter of said input seats being sufficiently smaller than the diameter of said pistons that with only one input pressurized and said piston and said diaphragms shifted away from said pressurized input, the diagphram opposite said pressurized input will be forced sealingly against the opposite input seat, such that subsequent pressurization of said opposite input will fail to open said opposite input seat, by virtue of the greater pressure force transmitted to the blocked seat from the diaphragm first pressurized, thus only if the second input is pressurized before blocking of its seat occurs can a pressurized output be obtained, leading to the desired no tie down features.

* * * * *